US009727637B2

(12) United States Patent
Visotski et al.

(10) Patent No.: US 9,727,637 B2
(45) Date of Patent: Aug. 8, 2017

(54) RETRIEVING TEXT FROM A CORPUS OF DOCUMENTS IN AN INFORMATION HANDLING SYSTEM

(71) Applicant: International Business Machines Corporation, Armonk, NY (US)

(72) Inventors: William G. Visotski, Lowell, MA (US); David E. Wilson, Lowell, MA (US)

(73) Assignee: International Business Machines Corporation, Armonk, NY (US)

( * ) Notice: Subject to any disclaimer, the term of this patent is extended or adjusted under 35 U.S.C. 154(b) by 399 days.

(21) Appl. No.: 14/462,662

(22) Filed: Aug. 19, 2014

(65) Prior Publication Data

US 2016/0055234 A1 Feb. 25, 2016

(51) Int. Cl.
 *G06F 17/00* (2006.01)
 *G06F 17/30* (2006.01)
(52) U.S. Cl.
 CPC .. *G06F 17/30654* (2013.01); *G06F 17/30719* (2013.01)
(58) Field of Classification Search
 CPC ......... G06F 17/30654; G06F 17/30684; G06F 17/28; G06F 17/30424; G06F 17/30507
 See application file for complete search history.

(56) References Cited

U.S. PATENT DOCUMENTS

| | | |
|---|---|---|
| 2004/0049499 A1 | 3/2004 | Nomoto et al. |
| 2008/0104023 A1 | 5/2008 | Dawes |
| 2009/0287678 A1 | 11/2009 | Brown et al. |
| 2011/0066587 A1 | 3/2011 | Ferrucci et al. |
| 2011/0125734 A1 | 5/2011 | Duboue et al. |
| 2012/0078895 A1 | 3/2012 | Chu-Carroll et al. |
| 2012/0078926 A1* | 3/2012 | Chu-Carroll ............. G06N 5/02 707/755 |
| 2013/0007055 A1 | 1/2013 | Brown et al. |

(Continued)

OTHER PUBLICATIONS

"Method to extract simple and compound terms from text corpuses (without performing full semantic analysis)", Disclosed Anonymously, www.ip.com, IPCOM000220204D, Jul. 25, 2012, 6 pages.

(Continued)

*Primary Examiner* — Truong Vo
(74) *Attorney, Agent, or Firm* — Francis Lammes; Stephen J. Walder, Jr.; Diana R. Gerhardt

(57) ABSTRACT

A mechanism is provided for retrieving candidate answers from a corpus of documents. The mechanism receives an input question for which an answer is sought. The mechanism extracts features of the input question based on a natural language processing. The mechanism executes a first search of the corpus of documents based on a first subset of the extracted features of the input question and an initial evaluation of a utility of the first subset of extracted features to generate a subset of documents. The mechanism executes a second search of a set of passages extracted from the subset of documents based on a second subset of the extracted features of the input question and a reevaluation of the utility of the second subset of extracted features thereby forming a subset of passages. The mechanism generates query results from the subset of passages matching from which candidate answers are identified.

20 Claims, 6 Drawing Sheets

(56) References Cited

U.S. PATENT DOCUMENTS

2013/0018652 A1    1/2013   Ferrucci et al.
2013/0066886 A1    3/2013   Bagchi et al.

OTHER PUBLICATIONS

High, Rob, "The Era of Cognitive Systems: An Inside Look at IBM Watson and How it Works", IBM Corporation, http://ip.com/pdf/redbook/REDP495500.pdf, Dec. 12, 2012, 16 pages. Dec. 12, 2012.
High, Rob et al., "Transforming the Way Organizations Think with Cognitive Systems", IBM Corporation, Redbooks, Dec. 13, 2012, 5 pages.
Yuan, Michael J., "Watson and healthcare", IBM Corporation, developerWorks, http://www.ibm.com/developerworks/industry/library/ind-watson/, Apr. 12, 2011, pp. 1-14.

\* cited by examiner

RETRIEVING TEXT FROM A CORPUS OF DOCUMENTS IN AN INFORMATION HANDLING SYSTEM

BACKGROUND

The present application relates generally to an improved data processing apparatus and method and more specifically to mechanisms for retrieving text from a corpus of documents in an information handling system.

With the increased usage of computing networks, such as the Internet, humans are currently inundated and overwhelmed with the amount of information available to them from various structured and unstructured sources. However, information gaps abound as users try to piece together what they believe to be relevant during searches for information on various subjects. To assist with such searches, recent research has been directed to generating information handling systems, such as Question and Answer (QA) systems, which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

One such QA system is the IBM Watson™ system available from International Business Machines (IBM) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

Various United States Patent Application Publications describe various types of question and answer systems. U.S. Patent Application Publication No. 2011/0125734 discloses a mechanism for generating question and answer pairs based on a corpus of data. The system starts with a set of questions and then analyzes the set of content to extract answer to those questions. U.S. Patent Application Publication No. 2011/0066587 discloses a mechanism for converting a report of analyzed information into a collection of questions and determining whether answers for the collection of questions are answered or refuted from the information set. The results data are incorporated into an updated information model.

SUMMARY

In one illustrative embodiment, a method, in a data processing system, is provided for retrieving text from a corpus of documents. The illustrative embodiment receives an input question for which an answer is sought. The illustrative embodiment extracts features of the input question based on a natural language processing of the input question. The illustrative embodiment executes a first search of the corpus of documents based on a first subset of the extracted features of the input question and an initial evaluation of a utility of the first subset of extracted features to generate a subset of documents matching the first subset of extracted features. The illustrative embodiment executes a second search of a set of passages extracted from the subset of documents based on a second subset of the extracted features of the input question and a reevaluation of the utility of the second subset of extracted features thereby forming a subset of passages. The illustrative embodiment generates query results from the subset of passages from which a set of candidate answers for the input question are identified.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
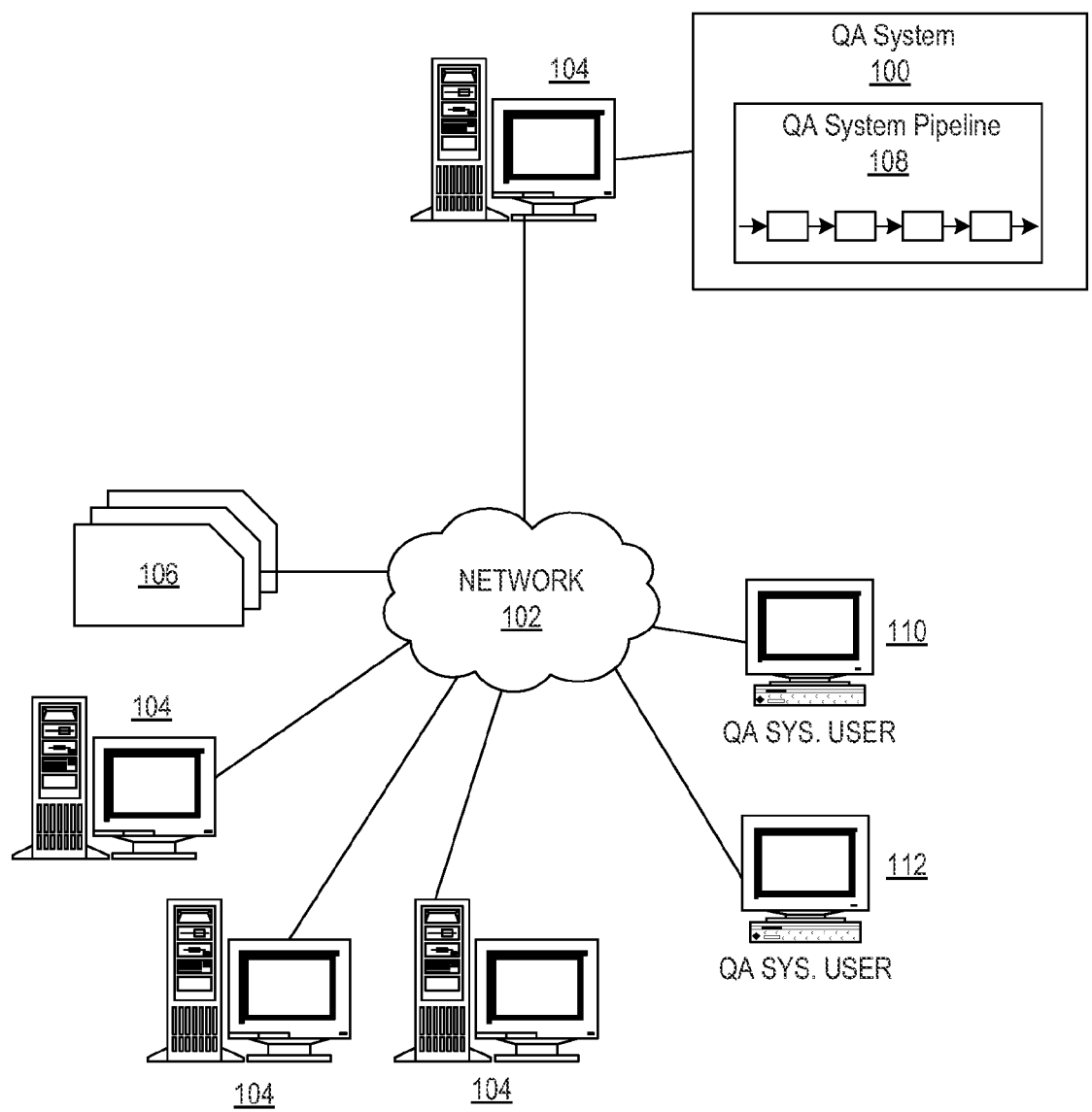
FIG. 1 depicts a schematic diagram of one illustrative embodiment of a question/answer creation (QA) system in a computer network.

The illustrative embodiments provide mechanisms for retrieving text from a corpus of documents in an information handling system. One such information handling system in which the mechanisms for retrieving text from a corpus of documents may operate is a question and answer (QA) system. A QA system is an artificial intelligence application executing on data processing hardware that answers questions pertaining to a given subject-matter domain presented in natural language. The QA system receives inputs from various sources including input over a network, a corpus of electronic documents or other data, data from a content creator, information from one or more content users, and other such inputs from other possible sources of input. Data storage devices store the knowledge base of data. A content creator creates content in a document for use as part of a knowledge base of data with the QA system. The document may include any file, text, article, or source of data for use in the QA system. For example, a QA system accesses a body of knowledge about the domain, where the body of knowledge (knowledge base) can be organized in a variety of configurations, e.g., a structured repository of domain-specific information, such as ontologies, or unstructured data related to the domain, or a collection of natural language documents about the domain.

Content users input questions to the QA system and the QA system answers the input questions using the content in the knowledge base of data by evaluating documents, passages within the documents, portions of data in the knowledge base, or the like. When a process evaluates a given passage of a document for semantic content, the process may use a variety of conventions to query such document from the QA system, e.g., sending the query to the QA system as a well-formed question which are interpreted by the QA system and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA system receives an input question, parses the question to extract the major features of the question, uses the extracted features to formulate queries, and applies those queries to the knowledge base of data. Based on the application of the queries to the knowledge base of data, the QA system generates a set of hypotheses or candidate answers to the input question, by looking across the knowledge base of data for passages of the knowledge base of data that have some potential for containing a valuable response to the input question.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

The present description and claims defines the terms "search", "searches", and any other form of the word "search" as any known or to be developed information retrieval algorithm or method, such as, but not limited to, those described in "Introduction to Information Retrieval" by Manning, Raghavan, and Schutze.

The present description and claims defines the term "knowledge base" in the context of "search" to be a structure containing word placement and statistical information that can be used for searching and scoring. An example of this would be an "inverted index" as described in "Introduction to Information Retrieval" by Manning, Raghavan, and Schutze. This example is not intended to be limiting, but only to give context.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Therefore, in order to generate candidate answers in a question answering system, the QA system first identifies relevant portions of text, or passages, from the knowledge base or corpus. This process is referred to as "primary search" or "text retrieval." However, current approaches to identifying relevant passages from a corpus share one common feature: the importance of any one extracted feature of an input question is calculated using statistics based on the entire corpus. One currently known approach to identifying relevant documents of a corpus includes breaking up the documents in the corpus into passages. Therefore, instead of working with complete documents, the QA system works with, and searches over, the sentences or paragraphs included in each passage, i.e. each passage can be considered to be a separate document. While this simple approach works well for finding evidence that is clearly stated, i.e. each feature of the input question is found in the passage, this approach would, however, miss cases where one feature of the input question is in one passage while another feature of the input question is in a different passage. For example, for the input question of "When did John F. Kennedy join the Navy?", this approach might determine that a passage that reads "John F. Kennedy joined the Navy in 1941" is a source of a candidate answer to the input question due to the fact that the passage includes the features of the input question "John F. Kennedy", "joined", and "Navy." However, this approach may not properly identify a passage of the type "He joined in 1941" in a document about John F. Kennedy, and in a section about the naval career of John F. Kennedy, as a source of a candidate answer, since the passage does not include the particular features "John F. Kennedy" or "Navy" present in the question.

Another currently known approach is to perform a search of the corpus to find the most relevant documents that include one or more of the extracted features from the input question and score the document. The approach then finds passages in those documents that contain one or more extracted features from the input questions and scores those passages. Finally, the approach combines the passage score with the document score, and ranks answers according to this combined score. However, while this approach may help retrieve passages from more relevant documents, the approach fails to identify some other passages because more important features of the input question appear far less frequently in the text of the documents and passages in the corpus than other less important features of the input question. For example, this approach may still fail to identify a source of a candidate answer to the input question in the passage "He joined in 1941" because, while a matching term of "joined" is present in both the input question and the passage, this term appears frequently in the corpus and is scored very low, i.e. is given a very low relative importance when evaluating passages relative to question features. On the other hand, the feature "John F. Kennedy" occurs far less frequently in the corpus than "joined" and is given a relatively high score compared to the feature "joined." As a result, in a document about John F. Kennedy, passages with "John F. Kennedy" in them will score far higher than ones that contain "joined." Hence, the passages with "joined," without other more highly ranked features being present, are essentially disregarded as not relevant to the input question.

In order to generate an answer to an input question from a corpus of documents in an information handling system, the illustrative embodiments perform a two-stage search and reevaluation of a discriminating power or utility of features from the input question between the two stages. Discriminating power of a feature identifies a degree to which the corresponding feature of an input question is able to discriminate between passages that are sources of candidate answers to the input question, and passages that are not sources of candidate answers to the input question. A measure of the discriminating power can be a function of an inverse document (or passage) frequency (the inverse of the proportion of documents/passages containing a particular term), term probabilities (the probability that a particular passage may include a particular term), or other statistic or measure. The measure of discriminating power or utility may be used to calculate passage scores with a given scoring algorithm. The discriminating power metric is indicative of the rarity of the feature, i.e. features that appear more often are less rare and thus, are less discriminating than features that appear less often and thus, are more discriminating. Discriminating power may be evaluated based on an individual feature basis or based on a combination of features with larger sets of features tending to be more discriminating and having a higher discriminating power than smaller sets of features.

Therefore, in the entire corpus, one extracted feature may have a large degree of discriminating power because of the rareness of the extracted feature overall, while other extracted features may have far less discriminating power because the other extracted features are relatively common terms that occur in many documents. Thus, in parsing the input question to extract the major features of the question, i.e. those with more discriminating power, the illustrative embodiments identify the major features of the question based on their discriminating power. Utilizing one or more extracted features, the QA system performs a search of the corpus to find the most relevant documents. The QA system eliminates the other less relevant documents from further processing using only the most relevant documents found by the first search. The QA system extracts all passages that are potentially relevant to the input question from the most relevant documents. The QA system then treats this set of passages as an entirely independent knowledge base and performs a second search on the identified passages of the most relevant documents found by the first search to thereby identify a subset of most relevant passages of the set of passages from the most relevant documents. That is, the second search is forced to recalculate the statistics or measures used to weight each feature. The features may or may not be the same, but the relative amount of discriminating power or utility of each feature has been reevaluated. As an example, in looking at all of Wikipedia, the word "join" has relatively little discriminatory power due to its commonness, but "John F. Kennedy" and "Navy" are less common and therefore have more discriminatory power. However, in looking at only the subset of articles from Wikipedia that are about John F. Kennedy and the Navy, "join" is now less common than either of the other terms and becomes more discriminatory.

Once the most specifically applicable passages of the set of passages of the most relevant documents in the corpus are identified, the QA system performs deep analysis on the language of the input question and the language used in each of these most specifically applicable passages of the corpus using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms, synonyms, and tenses within the language of the input question and the found passages of the corpus of data. Other reasoning algorithms may look at temporal or spatial features in the language, while others may evaluate the source of the passages of the corpus of data and evaluate its veracity.

The scores obtained from the various reasoning algorithms indicate the extent to which the potential response is inferred by the input question based on the specific area of focus of that reasoning algorithm. Each resulting score is weighted against a statistical model. The statistical model captures how well the reasoning algorithm performed at establishing the inference between two similar passages for a particular domain during the training period of the QA system. The statistical model may then be used to summarize a level of confidence that the QA system has regarding the evidence that the potential response, i.e. candidate answer, is inferred by the question. This process may be repeated for each of the candidate answers until the QA system identifies candidate answers that surface as being significantly stronger than others and thus, generates a final answer, or ranked set of answers, for the input question. The final answer may be returned to the submitter of the input question as an answer to the question via a graphical user interface or other output mechanism.

Figure 2:
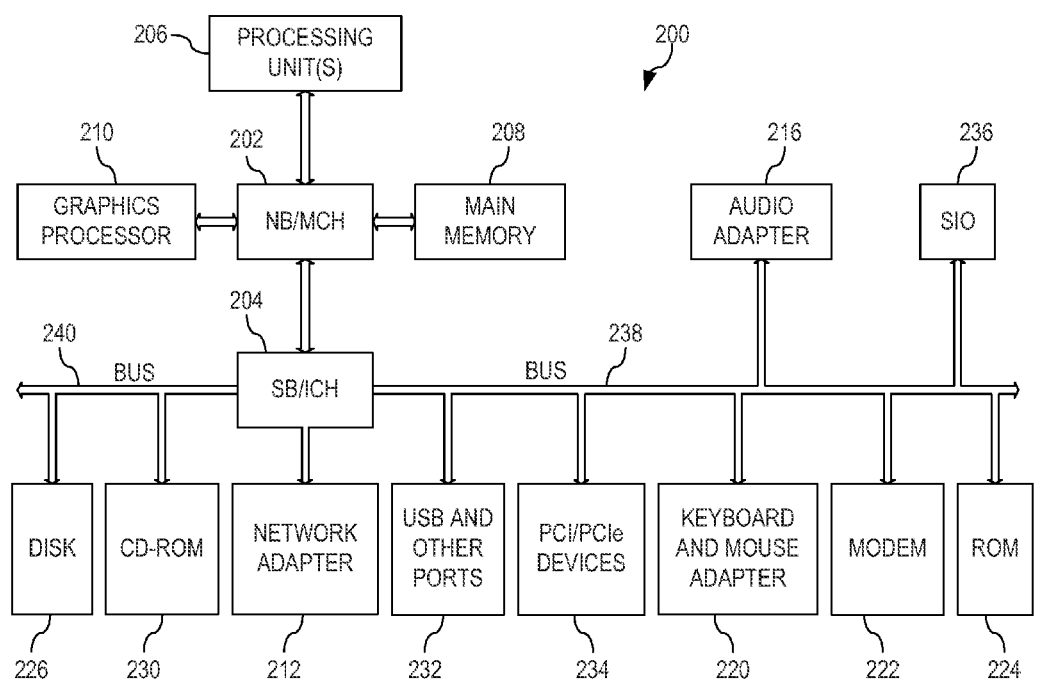
FIG. 2 is a block diagram of an example data processing system in which aspects of the illustrative embodiments may be implemented.
Figure 3:
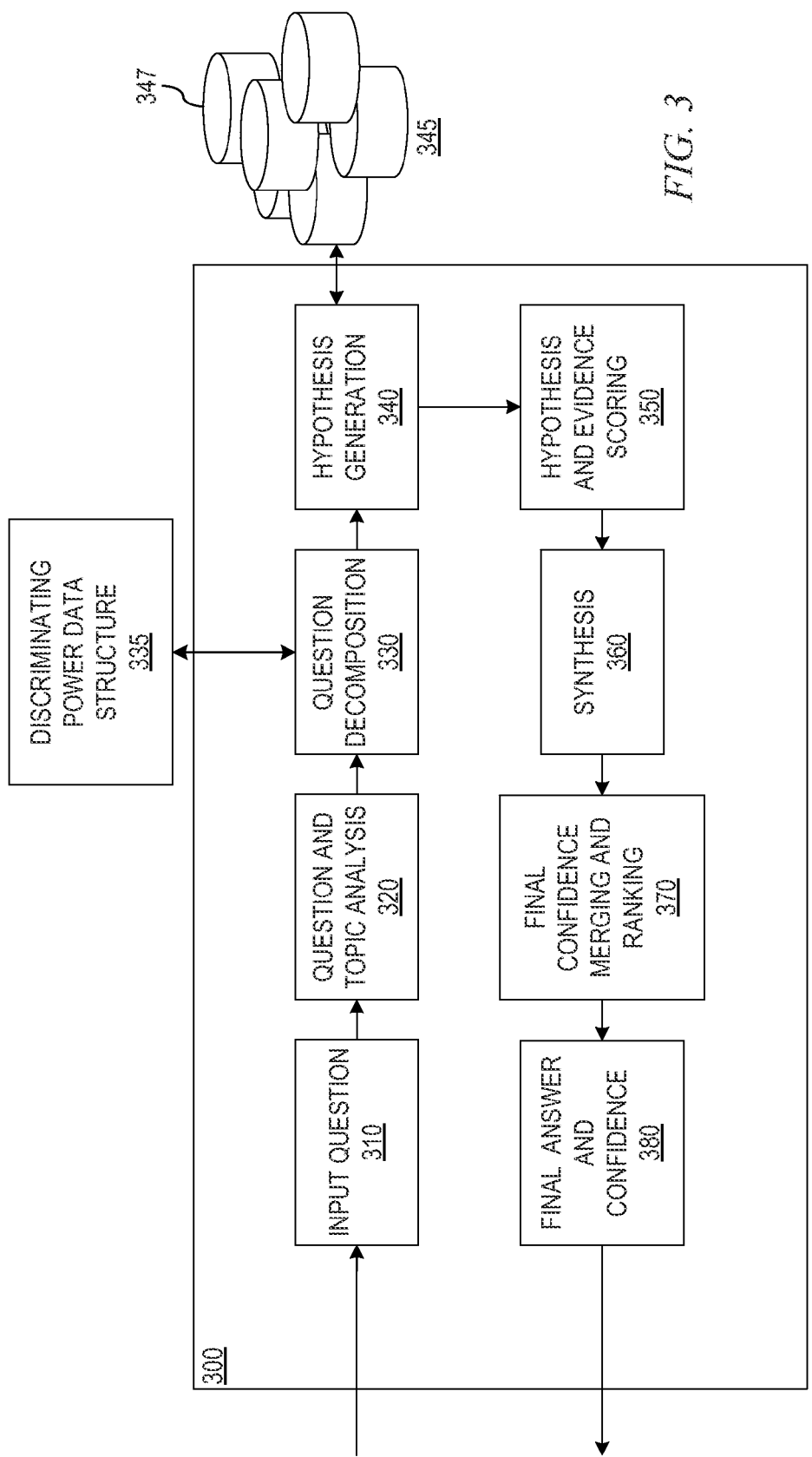
FIG. 3 illustrates a QA system pipeline for processing an input question in accordance with one illustrative embodiment.

FIGS. 1-3 are directed to describing an example Question/Answer, Question and Answer, or Question Answering (QA) system, methodology, and computer program product with which the mechanisms of the illustrative embodiments may be implemented. As will be discussed in greater detail hereafter, the illustrative embodiments may be integrated in, and may augment and extend the functionality of, these QA mechanisms with regard to retrieving text from a corpus of documents in an information handling system capable of answering questions. More specifically, the mechanisms of the illustrative embodiments searching a corpus using a multi-level approach so as to more accurately identify candidate answers to the input question.

In order to best understand the improvements offered by the mechanisms of the illustrative embodiments, it is important to first have an understanding of how question and answer creation in a QA system may be implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments may be implemented. Many modifications to the example QA system shown in FIGS. 1-3 may be implemented in various embodiments of the present invention without departing from the spirit and scope of the present invention.

QA mechanisms operate by accessing information from a knowledge base of data or information (also referred to as a knowledge base of content), analyzing it, and generating answer results based on the analysis of this data. Accessing information from a knowledge base of data typically includes: a database query that answers questions about what is in a collection of structured records, and a search that delivers a collection of documents and/or passages in response to a query against a collection of unstructured data (text, markup language, etc.). Conventional question answering systems are capable of generating answers based on the knowledge base of data and the input question, verifying answers to a collection of questions for the knowledge base of data, correcting errors in digital text using a knowledge base of data, and selecting answers to questions from a pool of potential answers, i.e. candidate answers.

Content creators, such as article authors, electronic document creators, web page authors, document database creators, and the like, may determine use cases for products, solutions, and services described in such content before writing their content. Consequently, the content creators may know what questions the content is intended to answer in a particular topic addressed by the content. Categorizing the questions, such as in terms of roles, type of information, tasks, or the like, associated with the question, in each document of a knowledge base of data may allow the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, may annotate or otherwise generate metadata for providing information useable by the QA system to identify these question and answer attributes of the content.

Operating on such content, the QA system generates answers for input questions using a plurality of intensive analysis mechanisms which evaluate the content to identify the most probable answers, i.e. candidate answers, for the input question. The illustrative embodiments leverage the work already done by the QA system to reduce the computation time and resource cost for subsequent processing of questions that are similar to questions already processed by the QA system.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 may be implemented on one or more computing devices 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. The QA system 100 and network 102 may enable question/answer (QA) generation functionality for one or more QA system users via their respective computing devices 110-112. Other embodiments of the QA system 100 may be used with components, systems, sub-systems, and/or devices other than those that are depicted herein.

The QA system 100 may be configured to implement a QA system pipeline 108 that receive inputs from various sources. For example, the QA system 100 may receive input from the network 102, a knowledge base of electronic documents 106, QA system users, or other data and other possible sources of input. In one embodiment, some or all of the inputs to the QA system 100 may be routed through the network 102. The various computing devices 104 on the network 102 may include access points for content creators and QA system users. Some of the computing devices 104 may include devices for a database storing the knowledge base of data 106 (which is shown as a separate entity in FIG. 1 for illustrative purposes only). Passages of the knowledge base of data 106 may also be provided on one or more other network attached storage devices, in one or more databases, or other computing devices not explicitly shown in FIG. 1. The network 102 may include local network connections and remote connections in various embodiments, such that the QA system 100 may operate in environments of any size, including local and global, e.g., the Internet.

In one embodiment, the content creator creates content in a document of the knowledge base of data 106 for use as part of a knowledge base of data with the QA system 100. The document may include any file, text, article, or source of data for use in the QA system 100. QA system users may access the QA system 100 via a network connection or an Internet connection to the network 102, and may input questions to the QA system 100 that may be answered by the content in the knowledge base of data 106. In one embodiment, the questions may be formed using natural language. The QA system 100 may interpret the question and provide a response to the QA system user, e.g., QA system user 110, containing one or more answers to the question. In some embodiments, the QA system 100 may provide a response to users in a ranked list of candidate answers.

The QA system 100 implements a QA system pipeline 108 which includes a plurality of stages for processing an input question, the knowledge base of data 106, and generating answers for the input question based on the processing of the knowledge base of data 106. The QA system pipeline 108 will be described in greater detail hereafter with regard to FIG. 3.

In some illustrative embodiments, the QA system 100 may be the IBM Watson™ QA system available from International Business Machines Corporation of Armonk, N.Y., which is augmented with the mechanisms of the illustrative embodiments described hereafter. The IBM Watson™ QA system may receive an input question which it parses to extract the major features of the question, that in turn are then used to formulate queries that are applied to the knowledge base of data. Based on the application of the queries to the knowledge base of data, a set of hypotheses, or candidate answers to the input question, are generated by looking across the knowledge base of data for passages of the knowledge base of data that have some potential for containing a valuable response to the input question.

The IBM Watson™ QA system performs deep analysis on the language of the input question and the language used in each of the identified passages of the knowledge base of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms, synonyms, and tenses within the language of the input question and the found passages of the knowledge base of data. Other reasoning algorithms may look at temporal or spatial features in the language, while others may evaluate the source of the passages of the knowledge base of data and evaluate its veracity.

The scores obtained from the various reasoning algorithms indicate the extent to which the potential response is inferred by the input question based on the specific area of focus of that reasoning algorithm. Each resulting score is weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

FIG. 2 is a block diagram of an example data processing system in which aspects of the illustrative embodiments may be implemented. Data processing system 200 is an example of a computer, such as server 104 or client 110 in FIG. 1, in which computer usable code or instructions implementing the processes for illustrative embodiments of the present invention may be located. In one illustrative embodiment, FIG. 2 represents a server computing device, such as a server 104, which, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer System p POWER8 computer system, running the Advanced Interactive Executive (AIX) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing an input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA system pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA system pipeline 300 includes a plurality of stages 310-380 through which the QA system operates to analyze an input question and generate a final response. In an initial question input stage 310, the QA system receives an input question that is presented in a natural language format. That is, a user inputs, via a user interface, an input question for which the user wishes to obtain an answer, e.g., "When did John F. Kennedy join the Navy?" In response to receiving the input question, the next stage of the QA system pipeline 300, i.e. the question and topic analysis stage 320, parses the input question using natural language processing (NLP) techniques to identify the major features of the question and classify the major features according to types, e.g., names, dates, or any of a plethora of other defined topics. Therefore, features with a higher discriminating power or utility may include proper names, words indicative of proximity or relationship, various counts of sentence sub-structure, phrase boundaries, such as prepositional phrases, verb phrases, or the like, topic, or the like. Features and/or types of features and their discriminating power may be defined in a discriminating power data structure 335 which the question and topic analysis stage 320 utilizes in parsing the input question to identify the major features of the question and classify the major features according to types.

For example, in the example question above, the term "when" may be associated with "temporal" features being sought, "John F. Kennedy" may be identified as a proper name of a person with which the question is associated, "join" may be identified as a word indicative of an action being performed, and "Navy" may be indicative of a noun or other language topic. Therefore, the question decomposition stage 330 searches for and identifies features that are useful for search. In the above example, these would include "John F. Kennedy," "join," and "Navy." Utilizing the discriminating power data structure, the question decomposition stage 330 extracts the identified features with higher discriminating power thereby eliminating from further processing words with little, less, or no discriminating power, known as "stop words," such as articles, prepositions, conjunctions, or the like. Further, for any extracted word that has synonyms or other tense, the question decomposition stage 330 may add identified synonyms and tenses to the extracted features. The question decomposition stage 330 evaluates the discriminating power of each of the extracted features.

In hypothesis generation stage 340, queries are generated utilizing the extracted features based on their associated discriminating power value in any known or later developed query language, such as the Structure Query Language (SQL), or the like. The hypothesis generations stage 340 applies those queries to one or more databases storing information about the electronic texts, documents, articles, websites, and the like, that make up the corpora or knowledge base of data/information 345. That is, these various sources themselves, different collections of sources, and the like, may represent a different corpus 347 within the corpora or knowledge base 345. There may be different corpus 347 defined for different collections of documents based on various criteria depending upon the particular implementation. For example, different knowledge bases or corpora may be established for different topics, subject matter categories, sources of information, or the like. As one example, a first corpus may be associated with healthcare documents while a second corpus may be associated with financial documents. Alternatively, another corpus may be documents published by the U.S. Department of Energy while another corpus may be IBM Redbooks documents. Any collection of content having some similar attribute may be considered to be a corpus 347 within the corpora or knowledge base 345. The queries may be applied to one or more databases storing information about the electronic texts, documents, articles, websites, and the like, that make up the knowledge base of data/information, e.g., the knowledge base of data 106 in FIG. 1. The queries are applied to the knowledge base of data/information at the hypothesis generation stage 340 to generate results identifying potential hypotheses for answering the input question which can be evaluated.

In generating the results, hypothesis generation stage 340 builds and searches a statistical data structure, such as an index, using any search technology, such as the open source projects Lucene™ or Indri™. Initially, hypothesis generation stage 340 builds a statistical data structure of the entire knowledge base 345, considering documents in the statistical data structure to be entire documents. The statistical data structure includes for each document, for example, a title, a topic, an author, an abstract, the text of the document, etc. Hypothesis generation stage 340 searches the statistical data structure of the entire knowledge base 345 to find the most relevant documents utilizing the one or more queries generated using a subset of the identified major features generated in the question decomposition stage 330. In keeping with the example above, the subset of the identified features may include "John F. Kennedy," "Navy," and "join" as well as any synonyms or tenses of the subset of identified major features, as described previously. In performing the search, hypothesis generation stage 340 identifies the most relevant documents, i.e. a subset of documents, in knowledge base 345 that most closely relate to the subset of the identified major features of the input question utilizing an initial evaluation of the discriminating power of the each of the subset of the identified major features, thereby eliminating the remaining documents in knowledge base 345 from further consideration.

Each document in the subset of documents may include a plurality of passages and, while the entire document is identified by some combination of the terms "John F. Kennedy," "Navy," and "join," not every passage within the document may include all terms. Therefore, in order to reduce the number of passages that will be considered, hypothesis generation stage 340 extracts, from the subset of documents, all passages that include any of the identified features. The set of passages found during this stage are considered to be a new mini knowledge base or separate corpora 347.

The hypothesis generation stage 340 searches the new mini knowledge base or separate corpora 347 to find the most relevant passages, such as sections, paragraphs, sentences, or the like, from the plurality of passages of the subset of documents. The most relevant passages are identified by applying one or more queries (searching) generated using the identified major features generated in the question decomposition stage 330. However, by treating corpora 347 as independent of corpora 345, term distributions will be different in the second search than the first. This causes an implicit reevaluation of the relevancy, utility, or discriminating power of the subset of the identified major features used in the searches. Following the above example, the initial search would likely bring back a set of documents talking about John F. Kennedy, with a preference to those mentioning the Navy and joining This is because, in a general corpus, "John F. Kennedy" would occur less frequently than the other terms. However, when corpus 347 is generated from that subset of documents, the term distributions are different than those of 345. As the subset of documents were predominantly about John F. Kennedy, his name is now fairly common in corpora 347—more common than the other terms "Navy" and "joined". Therefore, in the absence of passages that contain all search terms, the second search of corpora 347 will prefer a passage that has only "joined" in a document about John F. Kennedy over one that has only "John F. Kennedy" in a document about John F. Kennedy.

Therefore, hypothesis generation stage 340 extracts a subset of passages from the subset of documents with potential of including an answer to the question, for example, passages with any search term. Hypothesis generation stage 340 searches the identified subset of passages as if the subset of passages is an independent knowledge base. In other words, the term statistics that are generated to support the desired information retrial method are re-calculated using only the extracted passages and the rest of the main knowledge base is eliminated from further consideration.

The simplest way to implement this second search is to build a separate statistical data structure containing only the extracted passages. The separate statistical data structure may be constructed using an open source search engine, such as Lucene™ or Indri™, and may generate statistics required for a search algorithm to search this statistical data structure, such as inverse passage frequency of terms (the inverse of the proportion of passages containing a particular term), or term probabilities (the probability that a particular passage may generate a particular term), or other statistic that are used to calculate passage scores with a given scoring algorithm, using only the extracted subset of passages as a basis, and execute that algorithm over the extracted subset of passages. Hypothesis generation stage 340 extracts candidate answers from the highest ranked passages from this second search using any known or to be developed method.

Utilizing this multilevel-based analysis, the application of the queries results in the extraction of data/information from knowledge base 345 matching the criteria of the particular query, based on the identified major features. This data/information is used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA system pipeline 300, in hypothesis and evidence scoring stage 350, performs a deep analysis and comparison of the language of the input question and the language of each hypothesis or "candidate answer" as well as performs evidence scoring to evaluate the likelihood that the particular hypothesis is a correct answer for the input question. As mentioned above, this may involve using a plurality of reasoning algorithms, each performing a separate type of analysis of the language of the input question and/or content of the knowledge base that provides evidence in support of, or not, of the hypothesis. Each reasoning algorithm generates a score based on the analysis it performs which indicates a measure of relevance of the individual portions of the knowledge base of data/information extracted by application of the queries as well as a measure of the correctness of the corresponding hypothesis, i.e. a measure of confidence in the hypothesis.

In the synthesis stage 360, the large number of relevance scores generated by the various reasoning algorithms may be synthesized into confidence scores for the various hypotheses. This process may involve applying weights to the various scores, where the weights have been determined through training of the statistical model employed by the QA system and/or dynamically updated, as described hereafter. The weighted scores may be processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence merging and ranking stage 370 which may compare the confidence scores and measures, compare them against predetermined thresholds, or perform any other analysis on the confidence scores to determine which hypotheses/candidate answers are the most likely to be the answer to the input question. The hypotheses/candidate answers may be ranked according to these comparisons to generate a ranked listing of hypotheses/candidate answers (hereafter simply referred to as "candidate answers").

At stage 380, a final answer and confidence score, or final set of candidate answers and confidence scores, may be generated using the final weights and output to the submitter of the original input question. The set of candidate answers is output via a graphical user interface generated using the mechanisms of the illustrative embodiment. As shown in FIG. 3, in accordance the illustrative embodiments, after stage 380, or as part of stage 380, the set of candidate answers is output via a graphical user interface generated using the mechanisms of the illustrative embodiment, which provide the user with the tools for collaborating with the QA system to review, evaluate, and modify the listing of candidate answers and the evidence associated with these candidate answers that is evaluated by the QA system.

Figure 4:
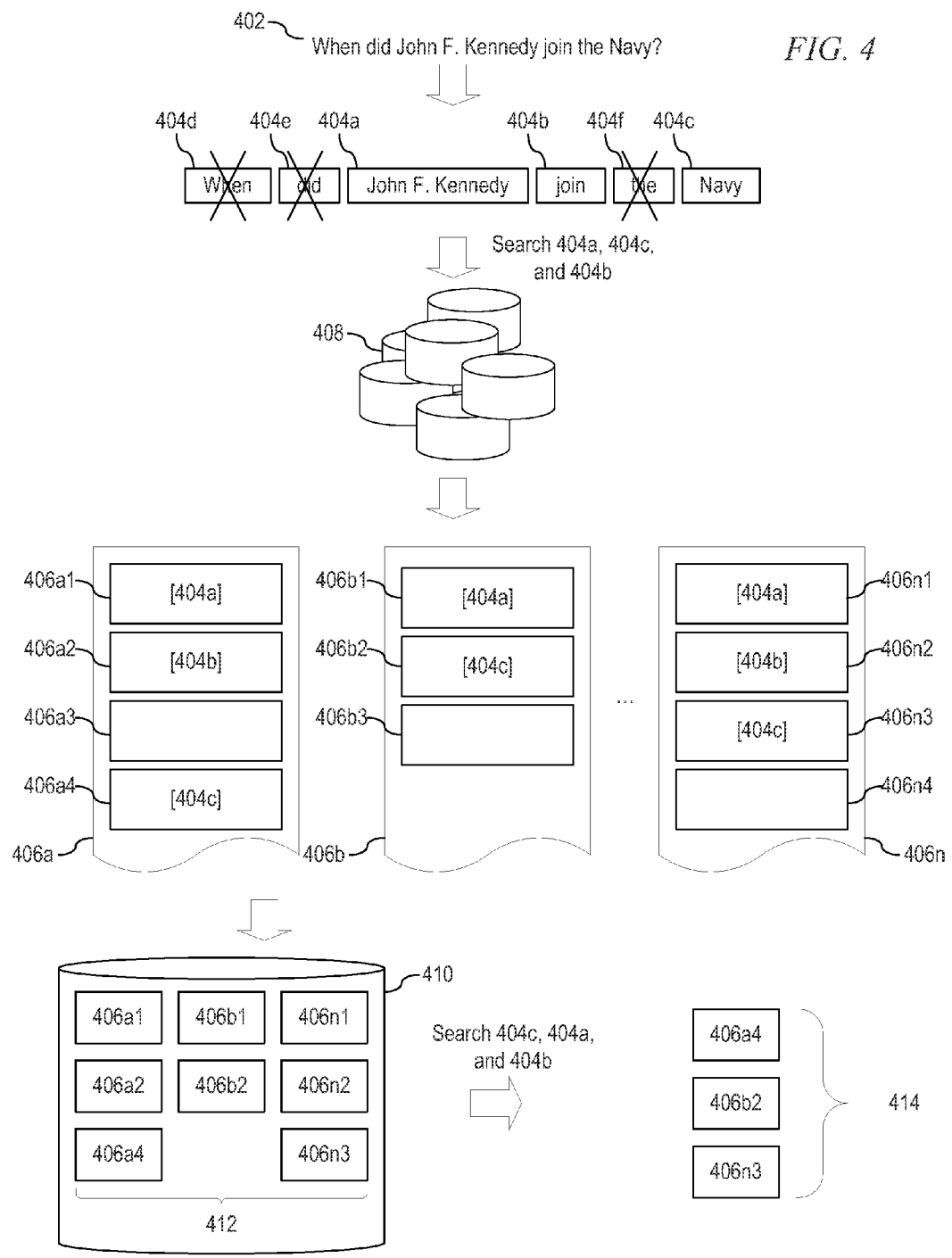
FIG. 4 illustrates the operation performed in retrieving text from a corpus of documents in accordance with the illustrative embodiment.

FIG. 4 illustrates the operation performed in retrieving text from a corpus of documents in accordance with the illustrative embodiment. In the operation, an initial question input stage of the QA system receives an input question 402.

A question and topic analysis stage of the QA system parses the input question using natural language processing (NLP) techniques to identify the major features of the question and classify the major features according to types. That is, the QA system parses input question 402, thereby identifying terms 404a-404b as major features and classifying term 404a as a noun, term 404b as a verb, and term 404c as a noun. It is noted that the QA system also identifies terms 404d-404f but these terms are not classified and, thus are eliminated, since their discriminating power does not make terms 404d-404f a major feature of the input question.

A hypothesis generation stage of the QA system searches a plurality of documents 406a-406n of a knowledge base 408 to find the most relevant documents utilizing the one or more queries generated using the identified major features identified in the question decomposition stage and utilizing an initial evaluation of the discriminating power of the each of the identified major features. For example, in this stage, the identified features include terms 404a, 404b, and 404c as well as any synonyms or tenses of the subset of identified major features. Based on this search, hypothesis generation stage identifies a subset of documents 406a, 406b, . . . , 406n. As illustrated, each of documents 406a, 406b, . . . , 406n include a plurality of passages. For example, document 406a includes passages 406a1, 406a2, 406a3, and 406a4, document 406b includes passages 406b1, 406b2, and 406b3, and document 406n includes passages 406n1, 406n2, 406n3, and 406n4. The hypothesis generation stage extracts, from the subset of documents, the one or more passages that include any of the identified features. Therefore, the hypothesis generation stage creates a new mini knowledge base 410 that includes passages 406a1, 406a2, 406a4, 406b1, 406b2, 406n1, 406n2, and 406n3 because these passages include at least one of terms 404a, 404b, and 404c. FIG. 4 depicts as an example the first term of terms 404a, 404b, and 404c included with each of passages 406a1, 406a2, 406a3, 406b1, 406b2, 406n1, 406n2, and 406n3 that causes the passage to be identified by the initial search by the hypothesis generation stage. As is further illustrated passages 406a3, 406b3 and 406n4 are not included in the identified passages as these passages do not include even one of terms 404a, 404b, and 404c.

The hypothesis generation stage searches the new mini knowledge base 410 to find the most relevant passages 412 from the plurality of passages of the subset of documents. The hypothesis generation stage searches the most relevant passages 412 by applying one or more queries generated using the identified major features generated in the question decomposition stage but by also using a reevaluation of the relevancy, utility, or discriminating power of the identified major features. The hypothesis and evidence scoring stage of the QA system utilizes results 414 in performing a deep analysis and comparison of the language of the input question and the language of each hypothesis or "candidate answer" as well as performs evidence scoring to evaluate the likelihood that the particular hypothesis is a correct answer for the input question.

Thus, using the mechanisms described above, or equivalent mechanisms in other QA systems generally known in the art, a system is developed that generates an answer to an input question from a corpus of documents in the QA system. The mechanisms identify passages potentially containing answers to the input question by re-evaluating the discriminating power of the extracted features from the input question. That is, in the entire knowledge base or corpora, one extracted feature may have a large degree of discriminating power because of the rareness of the extracted feature overall, while the other extracted features may have far less discriminating power because they are relatively common terms that occur in many documents. However, in a knowledge base or corpus that is largely about the concept represented by the words with the highest discriminating power from the question, those same terms may no longer be the most discriminating. Thus, in parsing the input question to extract the major features of the question, the mechanisms evaluate the discriminating power of each of the extracted features. Utilizing extracted features, the mechanisms perform a search of the corpus of documents to find the most relevant documents. The mechanisms extract passages that may potentially contain an answer to the input question from the most relevant documents. The mechanisms reevaluate the discriminating power of each of the extracted features using only the passages extracted from the most relevant documents. The mechanisms perform a second search on only the identified passages of the most relevant documents found by the first search to thereby identify the most relevant passages of the most relevant documents.

Figure 5:
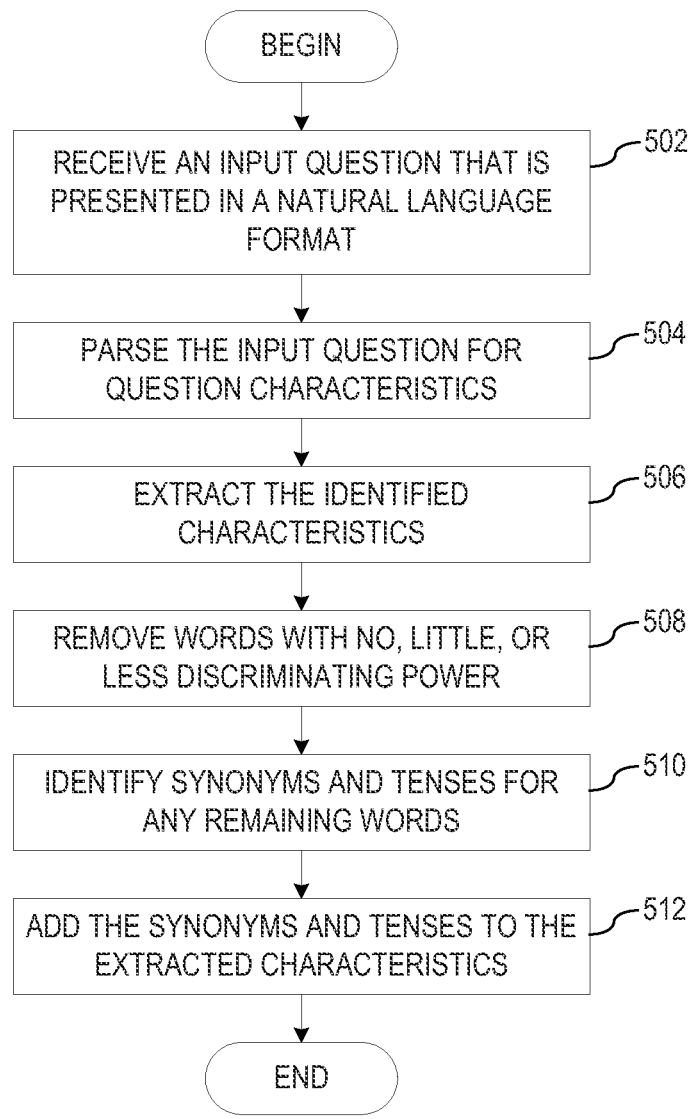
FIG. 5 depicts a flowchart outlining an example operation of a QA system for evaluating extracted features from an input question in order to identify the discriminating power of each feature in accordance with an illustrative embodiment.

FIG. 5 depicts a flowchart outlining an example operation of a QA system for evaluating extracted features from an input question in order to identify the discriminating power of each feature in accordance with an illustrative embodiment. As the operation begins, the QA system receives an input question that is presented in a natural language format (step 502). The QA system parses the input question, using natural language processing (NLP) techniques, for question features or features with higher discriminating power or utility (step 504), such as proper names, words indicative of proximity or relationship, average sentence length, various counts of sentence sub-structure, phrase boundaries, such as prepositional phrases, verb phrases, or the like, average word length, number of characters in a sentence, number of words in a passage, number of sentences in a passage, average sentence lexical composition, topic, or the like. The QA system extracts the identified major features (step 506) and, thereby, eliminating words with little, less, or no discriminating power or utility, known as "stop words" (step 508). The QA system identifies synonyms or tenses for any extracted word that has synonyms or other tenses (step 510). The QA system adds the synonyms and tenses to the extracted features (step 512), with the operation ending thereafter.

Figure 6:
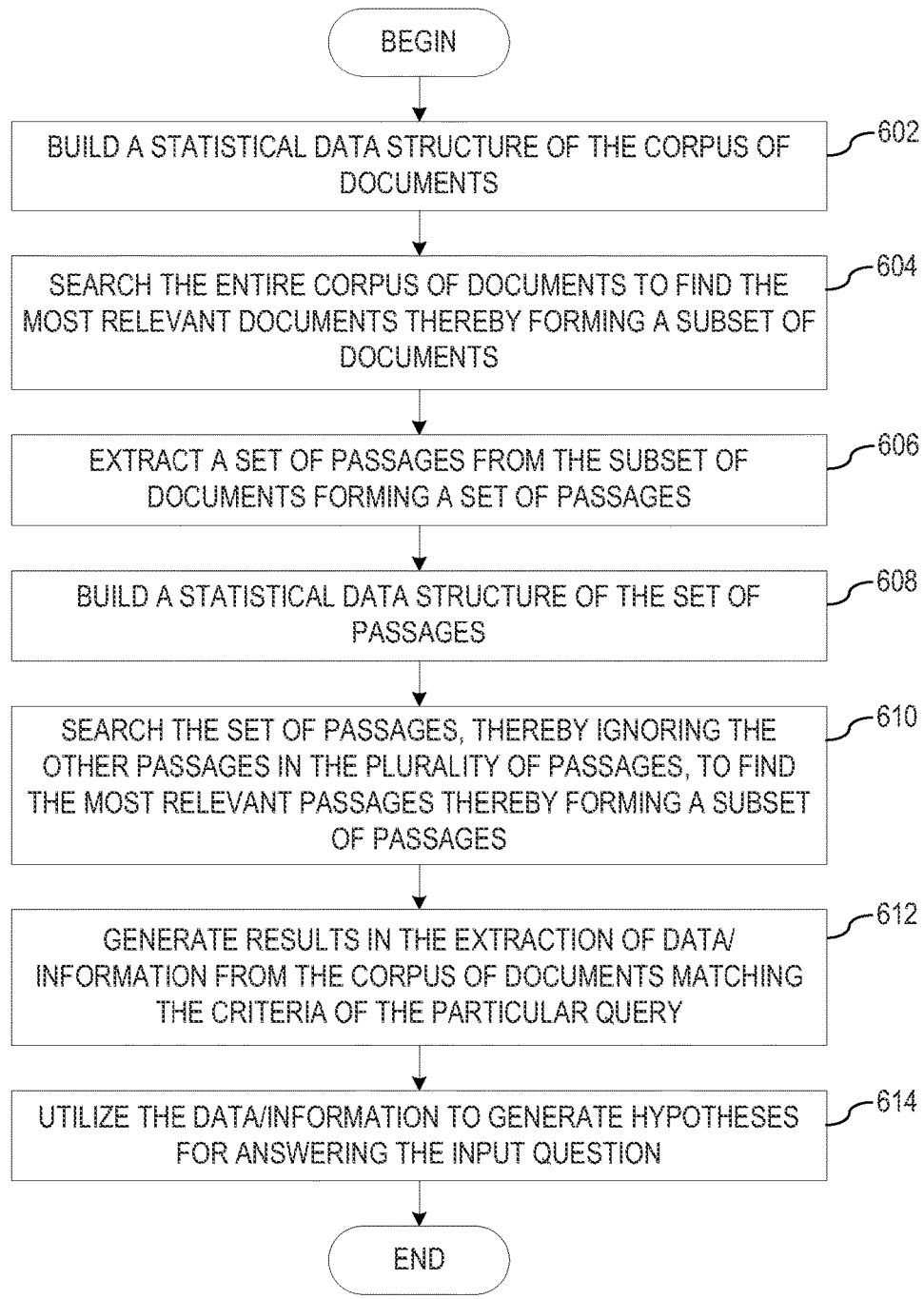
FIG. 6 depicts a flowchart outlining an example operation of a QA system for hypothesis generation in accordance with an illustrative embodiment.

FIG. 6 depicts a flowchart outlining an example operation of a QA system for hypothesis generation in accordance with an illustrative embodiment. As the operation begins, the QA system builds a statistical data structure of the entire corpus of documents (step 602) and searches the entire corpus of documents and/or statistical data structure to find the most relevant documents utilizing the one or more queries generated using the identified major features and an initial evaluation of the discriminating power or utility of the each of the subset of the identified major features, thereby forming a subset of documents (step 604). The QA system extracts a set of passages from the subset of documents using the identified major features (step 606), thereby forming a set of passages from the subset of documents. The QA system builds a statistical data structure of the set of passages that contain any of the identified major features (step 608), thereby eliminating all other passages in the subset of documents that do not contain at least one of the identified major features from further consideration. The QA system performs a second search of the subset of passages, to find the most relevant passages, such as sentences, paragraphs, subsections, or the like, from the subset of passages included in the subset of documents utilizing the one or more queries generated using the identified major features and a reevaluation of the relevancy, utility, or discriminating power of the subset of the identified major features (step 610). The QA system generates results in the extraction of data/information from the corpus of documents matching the criteria of the particular query, based on the identified major features (step 612). The QA system utilizes the data/information to generate hypotheses for answering the input question (step 614), with the operation ending thereafter. These hypotheses are also referred to herein as "candidate answers" for the input question.

Thus, the illustrative embodiments provide mechanisms for improved text retrieval from a corpus of documents in the QA system, the illustrative embodiments generate a set of passages for use in hypothesis generation by means of a multi-stage search. The first stage is a search for documents in the corpus, using features of the question extracted or generated by question processing, and using any known or to be created search algorithm or implementation. The highest scoring documents from this document search are set aside and the entire rest of the corpora is eliminated from further consideration. These set aside documents are then broken down into passages, for example clauses, sentences, paragraphs, or sections, depending on criteria such as but not limited to question length, expected answer length, or writing style. Then, a new statistical data structure is built containing only extracted passages that contain at least one of the features extracted from the question from question processing. The second stage is searching this second statistical data structure for the most relevant passages, again, using features extracted or generated by question processing. The generation of this second statistical data structure forces an implicit reevaluation of the discriminating power of the major features or the input question.

Following the example above, in a large knowledge base or corpora, the word "join" has little discriminating power because of the relative commonness of the term, and "John F. Kennedy" has a large amount of discriminating power because of the relative rareness of the term. However, in a small corpus that is largely about John F. Kennedy (the subset of documents generated by the first stage above), "John F. Kennedy" now has little discriminating power because it is more common, and "join" has substantially more because it is not well common. Therefore, if a passage does not exist that explicitly states "John F. Kennedy joined the Navy . . . ," this method will more likely find passages about joining in documents about John F. Kennedy than passages stating "John F. Kennedy" in irrelevant documents. Thus, by reevaluating the discriminating power of the search features, the illustrative embodiment extracts the most relevant portions of the most relevant passages to be processed by hypotheses generation.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a question and answer (QA) system comprising a processor and a memory, for retrieving candidate answers from a corpus of documents, the method comprising:

receiving, by the QA system, an input question for which an answer is sought;

extracting, by the QA system, features of the input question based on a natural language processing of the input question;

executing, by the QA system, a first search of the corpus of documents based on a first subset of the extracted features of the input question and an initial evaluation of a utility of the first subset of extracted features to generate a subset of documents matching the first subset of extracted features, wherein the utility of the first subset of extracted features identifies a degree to which each feature of the first subset of extracted features of the input question discriminates between documents in the corpus of documents that are sources of candidate answers to the input question;

executing, by the QA system, a second search of a set of passages extracted from the subset of documents based on a second subset of the extracted features of the input question and a reevaluation of the utility of the second subset of extracted features thereby forming a subset of passages, wherein the utility of the second subset of extracted features identifies a degree to which each feature of the second subset of extracted features of the input question discriminates between passages in the set of passages that are sources of candidate answers to the input question; and generating, by the QA system, query results from the subset of passages from which a set of candidate answers for the input question are identified.

2. The method of claim 1, wherein the set of passages extracted from the subset of documents is less than all of the passages included in the subset of documents.

3. The method of claim 1, wherein executing the first search of the corpus of documents based on the first subset of the extracted features of the input question and the initial evaluation of the utility of the first subset of extracted features to generate the subset of documents matching the first subset of extracted features comprises:

generating, by the QA system, a first statistical data structure for the corpus of documents; and identifying, by the QA system, the subset of documents from the corpus of documents comprised within the first statistical data structure relevant to the first subset of the extracted features utilizing the initial evaluation of the utility of the first subset of extracted features.

4. The method of claim 1, wherein executing the second search of the set of passages extracted from the subset of documents based on the second subset of the extracted features of the input question and the reevaluation of the utility of the second subset of extracted features comprises:

generating, by the QA system, a second statistical data structure for the set of passages; and identifying, by the QA system, the query results from the subset of passages comprised within the second statistical data structure relevant to the second subset of the extracted features utilizing the reevaluation of the utility of the second subset of extracted features.

5. The method of claim 1, wherein the extracted features of the input question are identified by:

identifying, by the QA system, a utility of each term in the input question;

eliminating, by the QA system, zero or more terms within the input question that comprise a utility less than a predetermined value; and adding, by the QA system, the remaining terms in the input question to the extracted features.

6. The method of claim 5, wherein the extracted features of the input question are further identified by:

identifying, by the QA system, one or more synonyms associated with the terms added to the extracted features; and adding, by the QA system, the one or more synonyms associated with the terms to the extracted features.

7. The method of claim 5, wherein the extracted features of the input question are further identified by:

identifying, by the QA system, one or more tenses associated with the terms added to the extracted features; and adding, by the QA system, the one or more tenses associated with the terms to the extracted features.

8. A computer program product comprising a computer readable storage medium having a computer readable program stored therein, wherein the computer readable program, when executed on a computing device, causes the computing device to:

receive an input question for which an answer is sought;

extract features of the input question based on a natural language processing of the input question;

execute a first search of a corpus of documents based on a first subset of the extracted features of the input question and an initial evaluation of a utility of the first subset of extracted features to generate a subset of documents matching the first subset of extracted features, wherein the utility of the first subset of extracted features identifies a degree to which each feature of the first subset of extracted features of the input question discriminates between documents in the corpus of documents that are sources of candidate answers to the input question;

execute a second search of a set of passages extracted from the subset of documents based on a second subset of the extracted features of the input question and a reevaluation of the utility of the second subset of extracted features thereby forming a subset of passages, wherein the utility of the second subset of extracted features identifies a degree to which each feature of the second subset of extracted features of the input question discriminates between passages in the set of passages that are sources of candidate answers to the input question; and generate query results from the subset of passages from which a set of candidate answers for the input question are identified.

9. The computer program product of claim 8, wherein the set of passages extracted from the subset of documents is less than all of the passages included in the subset of documents.

10. The computer program product of claim 8, wherein the computer readable program to execute the first search of the corpus of documents based on the first subset of the extracted features of the input question and the initial evaluation of the utility of the first subset of extracted features to generate the subset of documents matching the first subset of extracted features further causes the computing device to:

generate a first statistical data structure for the corpus of documents; and identify the subset of documents from the corpus of documents comprised within the first statistical data structure relevant to the first subset of the extracted features utilizing the initial evaluation of the utility of the first subset of extracted features.

11. The computer program product of claim 8, wherein the computer readable program to execute the second search of the set of passages extracted from the subset of documents based on the second subset of the extracted features of the input question and the reevaluation of the utility of the second subset of extracted features further causes the computing device to:

generate a second statistical data structure for the set of passages; and identify the query results from the subset of passages comprised within the second statistical data structure relevant to the second subset of the extracted features utilizing the reevaluation of the utility of the second subset of extracted features.

12. The computer program product of claim 8, wherein the extracted features of the input question are identified by the computer readable program causing the computing device to:

identify a utility of each term in the input question;

eliminate zero or more terms within the input question that comprise a utility less than a predetermined value; and add the remaining terms in the input question to the extracted features.

13. The computer program product of claim 12, wherein the extracted features of the input question are further identified by the computer readable program causing the computing device to:

identify one or more synonyms associated with the terms added to the extracted features; and add the one or more synonyms associated with the terms to the extracted features.

14. The computer program product of claim 12, wherein the extracted features of the input question are further identified by the computer readable program causing the computing device to:

identify one or more tenses associated with the terms added to the extracted features; and add the one or more tenses associated with the terms to the extracted features.

15. An apparatus comprising:
a processor; and
a memory coupled to the processor, wherein the memory comprises instructions which, when executed by the processor, cause the processor to:
receive an input question for which an answer is sought;
extract features of the input question based on a natural language processing of the input question;
execute a first search of a corpus of documents based on a first subset of the extracted features of the input question and an initial evaluation of a utility of the first subset of extracted features to generate a subset of documents matching the first subset of extracted features, wherein the utility of the first subset of extracted features identifies a degree to which each feature of the first subset of extracted features of the input question discriminates between documents in the corpus of documents that are sources of candidate answers to the input question;
execute a second search of a set of passages extracted from the subset of documents based on a second subset of the extracted features of the input question and a reevaluation of the utility of the second subset of extracted features forming a subset of passages, wherein the utility of the second subset of extracted features identifies a degree to which each feature of the second subset of extracted features of the input question discriminates between passages in the set of passages that are sources of candidate answers to the input question; and
generate query results from the subset of passages from which a set of candidate answers for the input question are identified.

16. The apparatus of claim 15, wherein the set of passages extracted from the subset of documents is less than all of the passages included in the subset of documents.

17. The apparatus of claim 15, wherein the instructions to execute the first search of the corpus of documents based on the first subset of the extracted features of the input question and the initial evaluation of the utility of the first subset of extracted features to generate the subset of documents matching the first subset of extracted features further cause the processor:

generate a first statistical data structure for the corpus of documents; and
identify the subset of documents from the corpus of documents comprised within the first statistical data structure relevant to the first subset of the extracted features utilizing the initial evaluation of the utility of the first subset of extracted features.

18. The apparatus of claim 15, wherein the instructions to execute the second search of the set of passages extracted from the subset of documents based on the second subset of the extracted features of the input question and the reevaluation of the utility of the second subset of extracted features further cause the processor to:
generate a second statistical data structure for the set of passages; and
identify the query results from the subset of passages comprised within the second statistical data structure relevant to the second subset of the extracted features utilizing the reevaluation of the utility of the second subset of extracted features.

19. The apparatus of claim 15, wherein the extracted features of the input question are identified by the instructions causing the processor to:
identify a utility of each term in the input question;
eliminate zero or more terms within the input question that comprise a utility less than a predetermined value; and
add the remaining terms in the input question to the extracted features.

20. The apparatus of claim 19, wherein the extracted features of the input question are further identified by the instructions causing the processor to:
identify one or more synonyms associated with the terms added to the extracted features;
add the one or more synonyms associated with the terms to the extracted features;
identify one or more tenses associated with the terms added to the extracted features; and
add the one or more tenses associated with the terms to the extracted features.

* * * * *